United States Patent Office 3,225,079
Patented Dec. 21, 1965

3,225,079
2,5-DIMETHYLHEXANE-2,5-DI(PEROXY CARBONATES)
James B. Harrison, Elyria, Ohio, and Orville L. Mageli, Kenmore, N.Y., assignors to Wallace & Tiernan Incorporated, Newark, N.J.
No Drawing. Original application June 1, 1959, Ser. No. 817,094, now Patent No. 3,117,166, dated Jan. 6, 1963. Divided and this application Jan. 6, 1964, Ser. No. 336,028
5 Claims. (Cl. 260—463)

The present invention relates to peroxy derivatives of 2,5-dimethylhexane-2,5-dihydroperoxide.

This is a division of Serial No. 817,094 filed June 1, 1959, now U.S. Patent No. 3,117,166, and is directed to the so-called percarbonate derivatives of 2,5-dimethylhexane-2,5-hydroperoxide.

The parent 2,5-dimethylhexane-2,5-dihydroperoxide offers interesting possibilities as a polymerization initiator, but is not particularly suitable for so-called high temperature operation because of its sensitivity to induced decomposition The polyfunctional 2,5 - dimethylhexane - 2,5-dihydroperoxide offers, however, a medium from which other polyfunctional peroxides can be prepared, such polyfunctional peroxy compounds being suitable for use particularly as polymerization initiators or the so-called polymerization initiators or the so-called polymerization catalysts.

It has been found that the products of the present invention do not suffer from the defect of the parent.

When the polyfunctional hydroperoxide 2,5-dimethylhexane-2,5-dihydroperoxide is reacted with a haloformate or related material, a precarbonate is the resultant product, the percarbonates differing from esters, R'COR, where R' is the peroxy radical of 2,5-dimethylhexane-2,5-dihydroperoxide, and R is the radical from the employed acid chloride or anhydride, while the percarbonates are R"COOR, wherein R may be a saturated aliphatic group of from 1 to 11 carbon atoms inclusive, e.g., lower alkyl, and halogen-substituted alkyl radicals, as for instance ClCH$_2$–.

The reaction to produce the percarbonate, as for instance, by reaction of one molar quantity of 2,5-dimethylhexane-2,5-dihydroperoxide with two molar quantities of of ethylchloroformate will produce the percarbonate as shown in the specific example as follows:

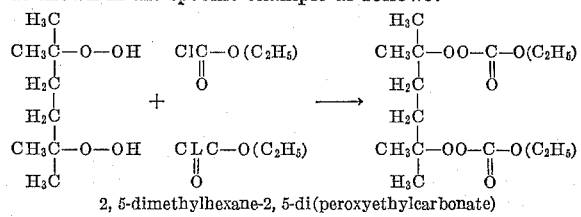

2, 5-dimethylhexane-2, 5-di(peroxyethylcarbonate)

Where stoichiometric quantities of reactants are chosen, as indicated above, based upon the presence of two hydroperoxide groups in the parent compound, the diperoxy derivatives are the end result. If it be desired to produce the monoderivative, one-half of the stoichiometric amount of reactant required to react with all of the hydroperoxide groups is chosen as the reactant, and it is suggested that the reaction preferably, under such circumstances, be carried out in an inert organic solvent. Having prepared initially a mono-derivative containing a free hydroperoxide group, a mixed derivative can thereafter be prepared from such monoderivative.

The new products of the present invention are either solids or high boiling point oils which possess particular efficacy as initiators of polymerization reactions, depending upon polymerization by reason of the presence of ethylenic unsaturation, as for instance in vinyl compounds and in the polyester materials, each of which possesses vinyl or ethylenic unsaturation. In the case of the vinyl compounds, exceptionally clear, colorless, and nondarkening products result.

The following examples are given as specific illustrations of representative compounds prepared within the scope of the invention and are not to be deemed as limitative of the invention. In substantially all instances, the active oxygen content was determined by accepted standard procedures, as for instance, by potassium iodide thiosulfate titration; by ultimate analysis for carbon and hydrogen; or by molecular refraction and, in some instances; some or all of these testing techniques were employed.

In Example 1 immediately below, there is described a suggested procedure for preparing the parent dihydroperoxide in excellent yield and of exceptional purity after one recrystallization:

*Example 1.—2,5-dimethylhexane-2,5-dihydroperoxide*

To 462 gm. (6.8 moles) of 50% hydrogen peroxide was gradually added, over a period of 30 minutes, 434 gm. of 77% sulfuric acid with vigorous stirring. The temperature was kept at 10° C. Then a 100 gm. (0.69 mole) of 2,5-dimethylhexanediol-2,5 was added to the acid-hydrogen peroxide mixture in a single dose. Stirring was continued at 10° C. for 10 minutes, then gradually warmed up to room temperature and continued for an additional hour.

The crude dihydroperoxide was washed first with 100 ml. of unsaturated ammonium sulfate solution and then with two washings of 100 ml. portions of appropriate salt. The last washing had a pH of 5 and showed no reaction with catalase. After drying overnight in a Stokes dryer, the product weighed 103 gms. (82% yield, 16% active oxygen). Recrystallization from benzene yielded 90 gms. with 17.6% active oxygen (98% purity).

*Example 2.—2,5-dimethylhexane-2,5-di(peroxy ethyl carbonate)*

To a cold (0° C.) solution containing 9 g. (0.05 mole) of the dihydroperoxide, 80 ml. of ethyl ether and 12 ml. (0.15 mole) of pyridine was slowly added 11 g. (0.1 mole) ethyl chlorocarbonate. The addition period of 15 minutes was followed by an additional 15 minute stirring period. The reaction mixture was then filtered to remove solid pyridine hydrochloride. The ethereal solution was thoroughly washed, then dried over anhydrous magnesium sulfate. Removal of the ether under reduced pressure left a colorless, sweet-smelling oil.

$n_D^{27}$ 1.4423. $d_4^{27}$ 1.067.

Calculated for $C_{14}H_{26}O_8$: C, 52.16%; H, 8.13%; $MR_D$ 76.70; active oxygen, 9.93%. Found: C, 53.08%; H, 8.70%; $MR_D$, 79.60; active oxygen, 9.80%.

*Example 3.—2,5-dimethylhexane-2,5-di(peroxy beta-chloroethyl carbonate)*

To a cold (0° C.) solution containing 9 g. (0.05 mole) of the dihydroperoxide, 80 ml. of ethyl ether and 12 ml. (0.15 mole) of pyridine was slowly added 14.3 g. (0.1 mole) beta-chloroethyl chlorocarbonate. The addition period of 15 minutes was followed by an additional 15 minute stirring period. The reaction mixture was filtered to remove solid pyridine hydrochloride. The ethereal solution was thoroughly washed, then dried over anhydrous magnesium sulfate. Removal of the ether under reduced pressure left a colorless liquid.

$n_D^{26}$ 1.4535. $d_4^{27}$ 1.164.

Calculated for $C_{14}H_{24}O_8Cl_2$: $MR_D$, 87.76; active oxygen, 8.19%. Found: $MR_D$, 90.70; active oxygen, 7.90%.

*Example 4.—2,5-dimethylhexane-2,5-di(peroxy isobutyl carbonate)*

To a cold (0° C.) solution containing 9 g. (0.05 mole) of the dihydroperoxide, 80 ml. of ethyl ether and 12 ml. (0.15 mole) of pyridine was slowly added 13.7 g. (0.1 mole) isobutyl chlorocarbonate. The addition period of 15 minutes was followed by an additional 15 minute stirring period. The reaction mixture was then filtered to remove solid pyridine hydrochloride. The etheral solution was thoroughly washed, then dried over anhydrous magnesium sulfate. Removal of the ether under reduced pressure left a slightly yellowish liquid.

$n_D^{25}$ 1.4357.

Calculated for $C_{18}H_{34}O_8$: active oxygen, 8.46%. Found: active oxygen 6.44%.

What is claimed is:

1. A percarbonate of the formula:

where R' is

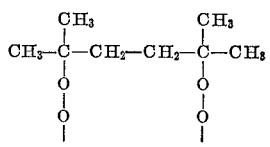

and R is selected from the group consisting of lower alkyl radicals and the monochlor derivatives thereof.

2. A percarbonate of the formula:

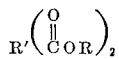

where R' is

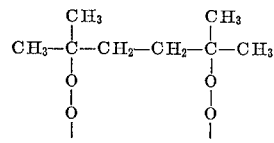

and R is a lower alkyl radical.

3. 2,5-dimethylhexane-2,5-di(peroxyethyl carbonate).

4. 2,5-dimethylhexane-2,5-di(peroxy beta chloro ethyl carbonate).

5. 2,5 - dimethylhexane - 2,5 - di(peroxy isobutyl carbonate).

References Cited by the Examiner

UNITED STATES PATENTS 2,374,789   5/1945   Strain _____ 260—463 X

CHARLES B. PARKER, *Primary Examiner.*

FLOYD D. HIGEL, *Assistant Examiner.*

UNITED STATES PATENT OFFICE
CERTIFICATE OF CORRECTION

Patent No. 3,225,079            December 21, 1965

James B. Harrison et al.

It is hereby certified that error appears in the above numbered patent requiring correction and that the said Letters Patent should read as corrected below.

Column 1, line 28, strike out "initiators or the so-called polymerization"; line 34, for "precarbonate" read -- percarbonate --; line 45, strike out "of"; same column 1, lines 47 to 55, for that portion of the formula reading

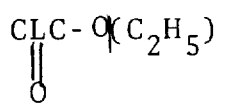     read     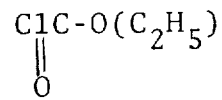

column 2, line 14, the semicolon should be a comma; line 65, before "filtered" insert -- then --; column 3, line 9, for "etheral" read -- ethereal --.

Signed and sealed this 29th day of November 1966.

(SEAL)
Attest:

ERNEST W. SWIDER            EDWARD J. BRENNER
Attesting Officer            Commissioner of Patents